(12) United States Patent
Wang (10) Patent No.: US 8,176,876 B2
(45) Date of Patent: May 15, 2012

(54) AQUARIUM PUMP WITH LED LAMPS

(75) Inventor: Yu-Chin Wang, Taipei (TW)

(73) Assignee: Eiko Electric Products Corp., Taipei (TW)

( * ) Notice: Subject to any disclaimer, the term of this patent is extended or adjusted under 35 U.S.C. 154(b) by 138 days.

(21) Appl. No.: 12/753,333

(22) Filed: Apr. 2, 2010

(65) Prior Publication Data

US 2011/0239951 A1 Oct. 6, 2011

(51) Int. Cl.
*A01K 63/04* (2006.01)

(52) U.S. Cl. ......... 119/261; 119/254; 119/266; 336/220

(58) Field of Classification Search .................. 119/226, 119/254, 259, 261, 263, 266; 210/416.2, 210/167.21, 167.25, 151; 417/423.7, 423.9, 417/572; 336/220, 208, 198, 310; 239/17, 239/18, 23
See application file for complete search history.

(56) References Cited

U.S. PATENT DOCUMENTS

| 4,512,724 | A | * | 4/1985 | Horvath | 417/319 |
| 4,944,871 | A | * | 7/1990 | Ogawa | 210/167.25 |
| 2007/0246413 | A1 | * | 10/2007 | Pulice et al. | 210/167.21 |
| 2007/0279177 | A1 | * | 12/2007 | Sarver et al. | 336/207 |
| 2008/0078330 | A1 | * | 4/2008 | McCallum et al. | 119/72 |

FOREIGN PATENT DOCUMENTS

| TW | M347827 | 1/2009 |
| TW | M372635 | 1/2010 |

* cited by examiner

*Primary Examiner* — Rob Swiatek
*Assistant Examiner* — Lisa Tsang
(74) *Attorney, Agent, or Firm* — Guice Patents PLLC (57) ABSTRACT

An aquarium pump having LED lamps, wherein the coil unit of a motor unit in the pump housing is used as a primary coil unit, and a first insulating layer is used to envelop the primary coil unit, then a secondary coil unit is used to wind the primary coil unit; taking advantage of induction of the secondary coil unit to the primary coil unit to generate a low voltage for using by the LED illuminating lamp set. Kinetic energy during rotation of an internal magnet of a motor for the pump is used as induction potential, this is the energy required that can get an effect of energy saving and carbon reducing.

5 Claims, 10 Drawing Sheets

Aquarium Pump with LED Lamps

BACKGROUND OF THE INVENTION

1. Field of the Invention

The present invention relates to an aquarium pump with LED lamps, and especially to an aquarium pump of which a coil of a motor is used as a primary coil unit, and a secondary coil unit is provided to induce a low voltage used for illumination of the LED lamps.

2. Description of the Prior Art

A pump for pumping air into water must be provided in an aquarium for the living things in the water. A conventional pump is provided with an air intake tube to connect an air pipe, an inlet unit for entering of water and an outlet; an internal sinking motor unit is used for pumping water and air into the aquarium from the outlet, and a filter can be provided under the sinking motor for filtering water.

And more, the aquarium is also provided with illuminating lamps. Conventional illuminating lamps used are halo spots, they must be provided with a device composed of a rectifier for use. And because of the requirement of environmental conservation in the present days, it is a tendency that an LED lamp set is used instead of the conventional halo spots. For example, in a published prior art Taiwan Utility model "ILLUMINATING EQUIPMENT FOR AQUARIUM" with a publication no. M372635, an illuminating equipment comprises: an adjustable bracket of which one end is fixed onto the aquarium for adjusting; an LED lamp set connecting to the other end of the adjustable bracket; by rotation of an adjusting seat and a rotatable arm, an effect of adjusting the irradiation angle can be achieved, and by using different sheets provided with lenses, various ranges of irradiation can be provided, i.e., range of irradiation can be adjusted; further, by using LED lamps with different temperatures and colors, effect of having different temperatures and colors can be achieved.

And more, in a published prior art Taiwan Utility model "LED ILLUMINATING DEVICE FOR AQUARIUM" with a publication no. M347827, an LED illuminating lamp set installed on an aquarium is disclosed, wherein a lampshade is embedded in its periphery having LEDs with semi-spherical reflective cups; under the lampshade, an assembly including a plurality of light gathering sheets and separating boards are engaged in grooves at the bottom edge of the lampshade for positioning, hence the irradiated lights from the LEDs are concentrated within the aquarium to increase penetrating strength of light beams, to increase brightness and reduce lamps used for preventing dazzling lights offensive to eyes and for preventing breeding of aquatic plants in the glass case.

In the prior cases, LED lamps are applied, however, by the fact that the LED lamps must use low voltage for supplying electricity, while municipal electricity generally is 110V-220V, a voltage converter is necessary for applying the LED lamps, this largely increases cost, and makes complicate of the electric line connecting of the aquarium; thereby improvement is wanted.

SUMMARY OF THE INVENTION

The main technique of the present invention thereby is to provide an aquarium pump having LED lamps, the coil unit of a motor unit in the pump housing is used as a primary coil unit, and a first insulating layer is used to envelop the primary coil unit, then a secondary coil unit is used to wind the primary coil unit; taking advantage of induction of the secondary coil unit to the primary coil unit to generate a low voltage for using by the LED illuminating lamp set.

The aquarium pump having LED lamps of the present invention comprises:

a pump housing having an air intake for connecting an air pipe, a water inlet unit for entering of water, and a water outlet for pumping liquid and air into the aquarium;

a motor unit provided in the pump housing, being at least provided with a set of primary coil unit connected with a high voltage input power source which is electromagnetically conversed to rotate a rotor unit, and thereby to mix air and liquid to be pumped out of the water outlet;

a first insulating layer enveloping the primary coil unit of the motor unit;

a set of secondary coil unit winding the first insulating layer to induce the primary coil unit to generate a low voltage;

a second insulating layer enveloping the secondary coil unit; and a set of LED lamps, being lightened by the low voltage induced by the secondary coil unit.

In the aquarium pump having LED lamps of the present invention, the LED lamps can be provided near by the water outlet to provide an illumination effect for the water pumped out, and can also be provided on the top of the aquarium to form an illuminating lamp.

The aquarium pump having LED lamps of the present invention takes advantage of the primary coil unit to generate a low voltage by induction of the secondary coil unit for using by the LED illuminating lamp set; so that when the aquarium is provided with the LED lamps, no other power source converter is needed. This can reduce equipment disbursement; and by using the LED lamps, an effect of environmental conservation can be obtained. Particularly, kinetic energy during rotation of an internal magnet of a motor for the pump of the present invention is used as induction potential, this is the energy required that can get an effect of energy saving and carbon reducing, thus the product can be competitive; this is because that using only a few copper wires and insulating tapes, voltage converting cost can be saved.

Moreover, the aquarium pump having LED lamps of the present invention can be provided therebeneath with a filter to get the function of water filtering. And a consumer can choose freely to have the function of solely filtering the entering water or have the effect of adding oxygen.

The present invention will be apparent in its technical feature and effect of use after reading the detailed description of the preferred embodiments thereof in reference to the accompanying drawings.

DETAILED DESCRIPTION OF THE PREFERRED EMBODIMENT

Figure 1:
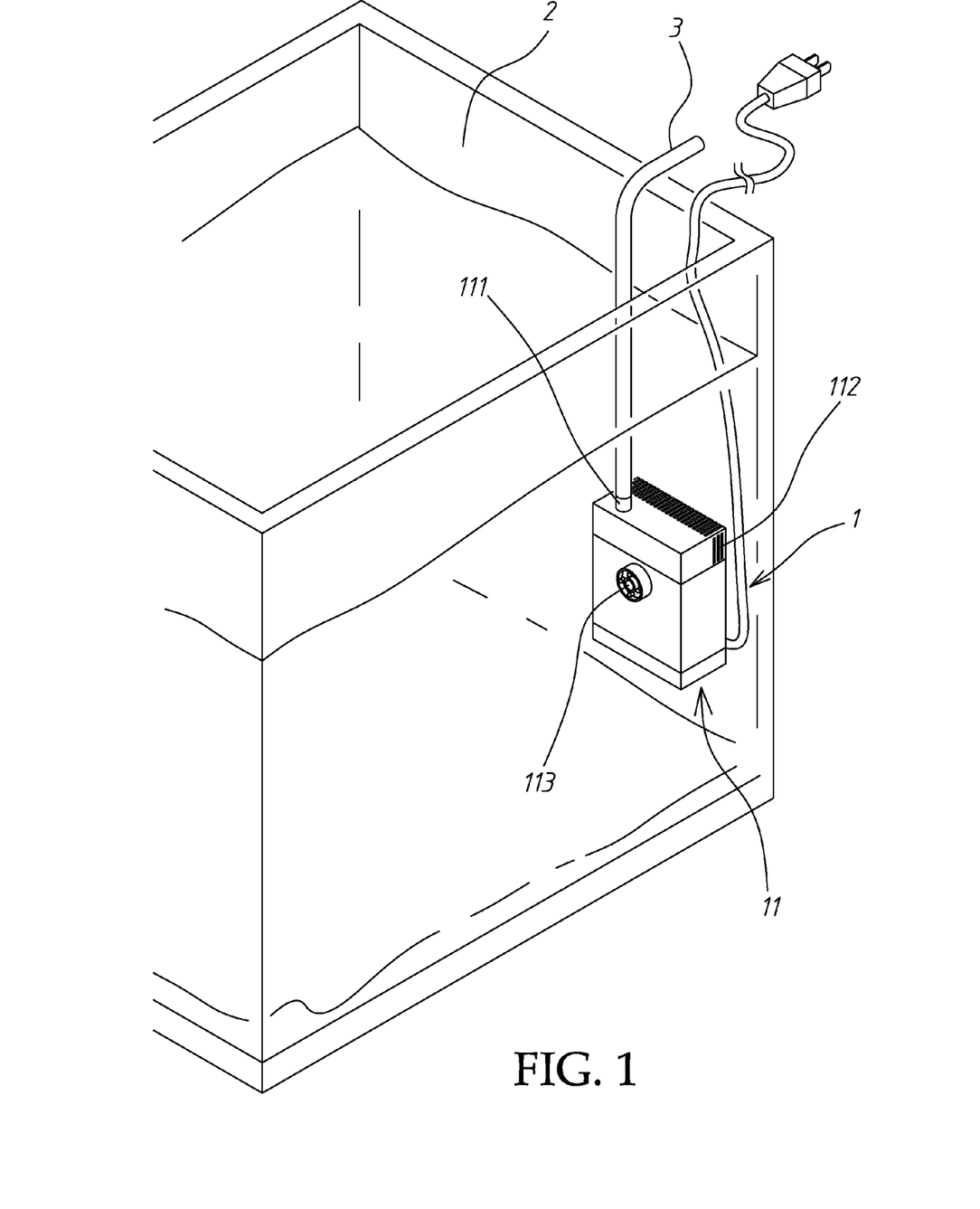
FIG. 1 is a perspective schematic view showing using of the present invention in an aquarium.

Referring to FIGS. 1-4, the present invention provides an aquarium pump 1 with LED lamps, the pump 1 is provided in an aquarium 2, as shown in FIG. 1, air is pumped into the water in the aquarium 2.

The pump 1 of the present invention is composed of a pump housing 11, a motor unit 12, a first insulating layer 13, a secondary coil unit 14, a second insulating layer 15 and an LED illuminating lamp set 16.

Figure 2:
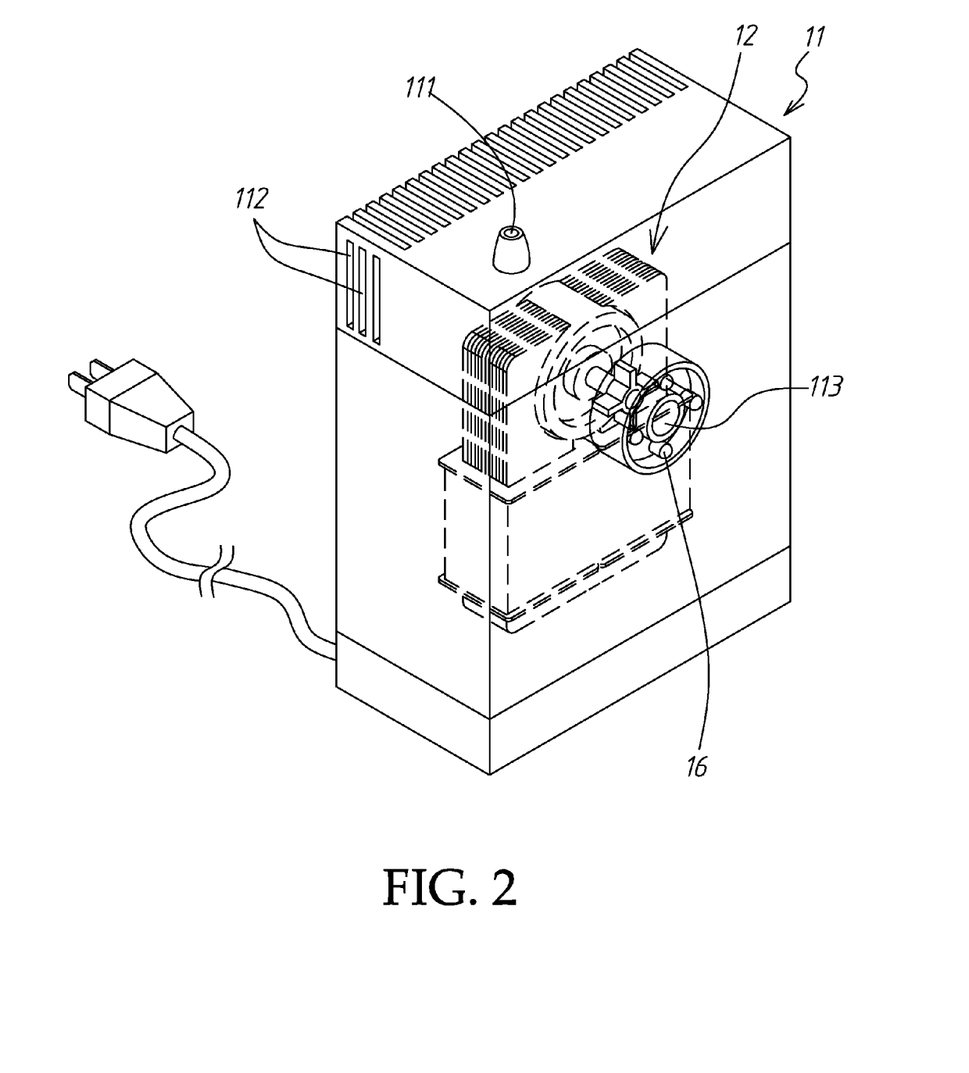
FIG. 2 is a perspective view showing the appearance of the present invention.

The pump housing 11 is generally same as that of the conventional pump of an aquarium, it mainly comprises: an air intake 111 for connecting an air pipe 3 (please refer to FIG. 1), a water inlet unit 112 for entering of water, and a water outlet 113 for pumping liquid and air into the aquarium 2. The motor unit 12 and the secondary coil unit 14 are provided in the pump housing 11 as is shown in FIG. 2. Water proofing glue can be poured outside the motor unit 12 and the secondary coil unit 14 in the pump housing 11 to prevent invading of liquid.

Figure 3:
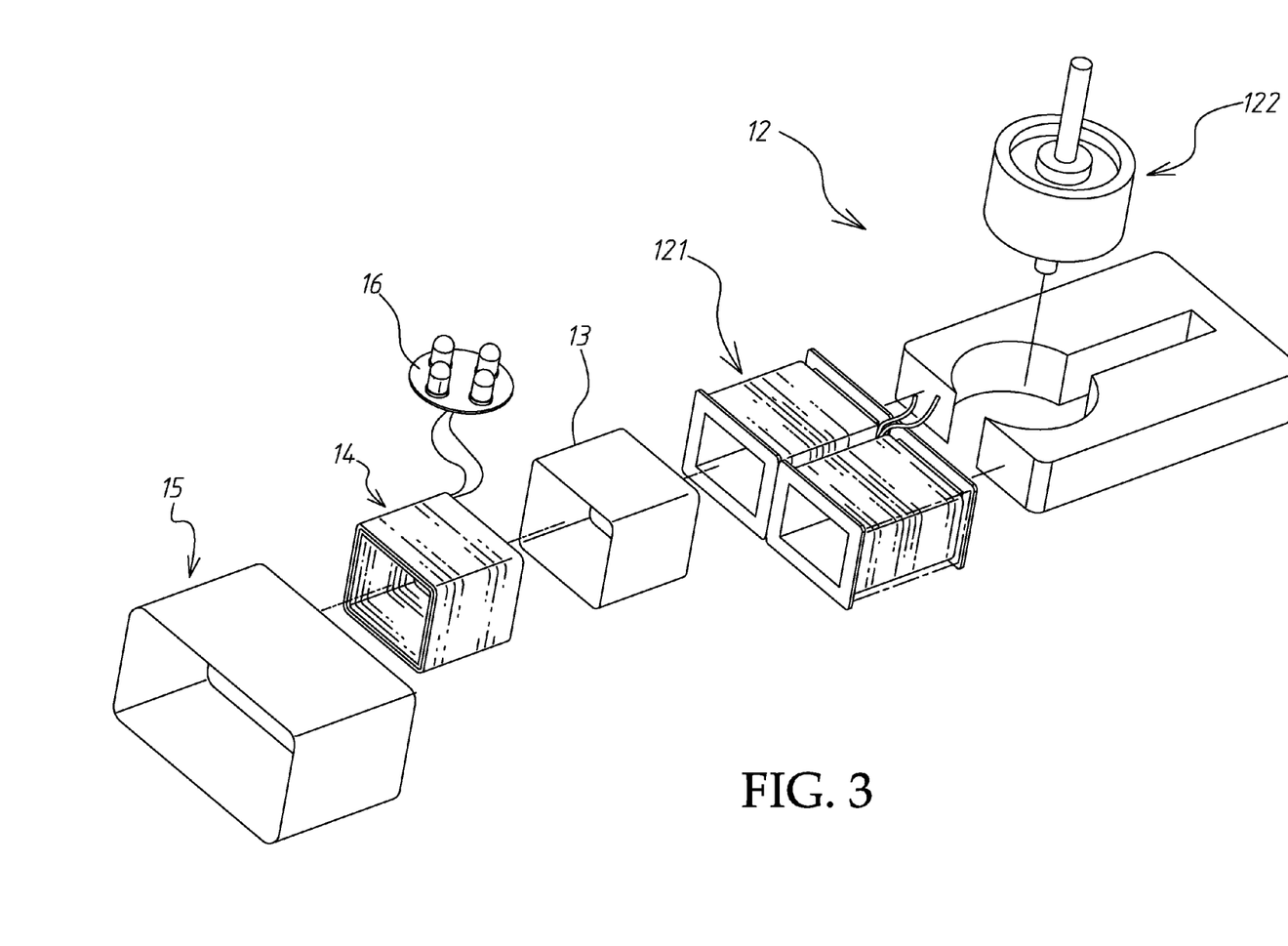
FIG. 3 is an anatomic perspective view of a motor, an insulating layer and a secondary coil unit of the present invention.
Figure 4:
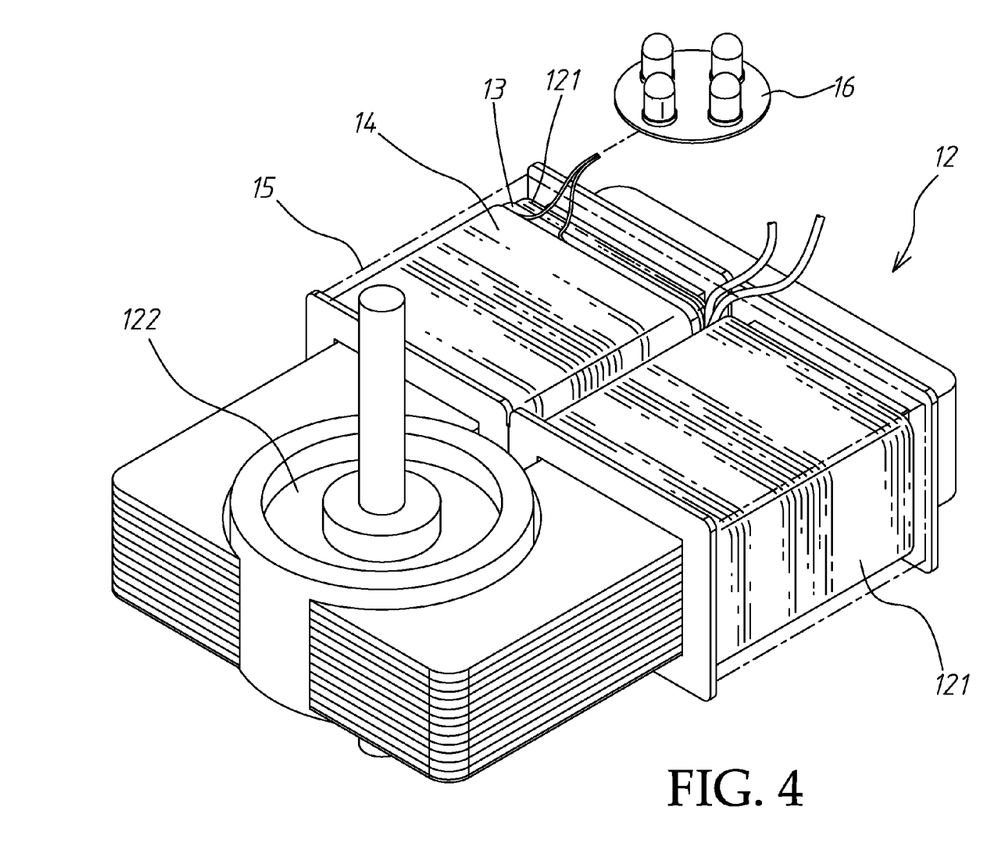
FIG. 4 shows a perspective view of the present invention after completion of assembling of FIG. 3.

Referring to FIG. 3, the motor unit 12 is provided at least with a primary coil unit 121 to connect with a high voltage input power source, for instance 110V-220V, after being electromagnetically conversed to rotate a rotor unit 122, and thereby to mix air and liquid water to be pumped out of the water outlet 113. The first insulating layer 13 envelops the primary coil unit 121 of the motor unit 12 to separate from the secondary coil unit 14.

Figure 5:
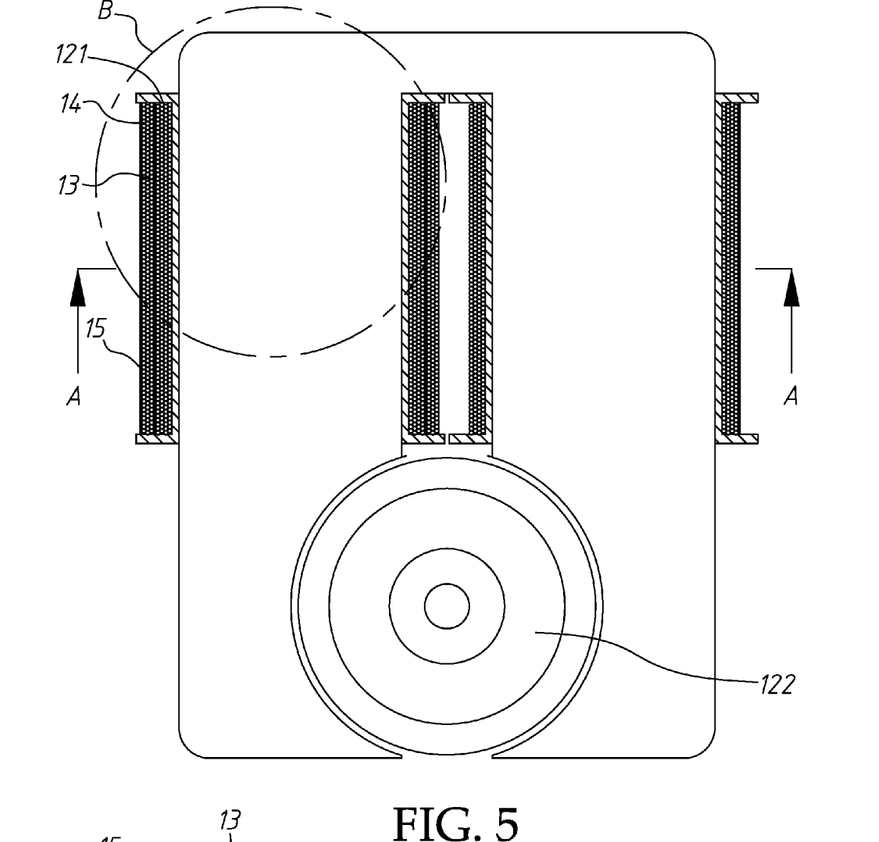
FIG. 5 is a sectional view of the present invention.
Figure 6:
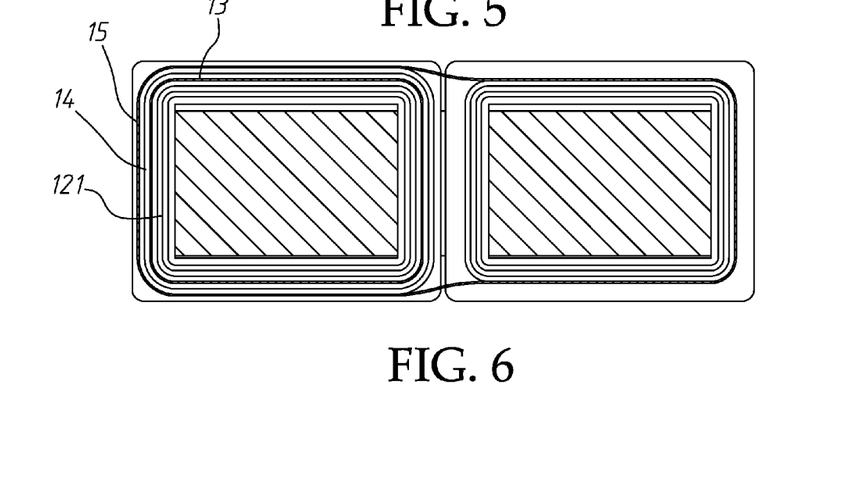
FIG. 6 is a sectional view taken from the section line A-A of FIG. 5.
Figure 7:
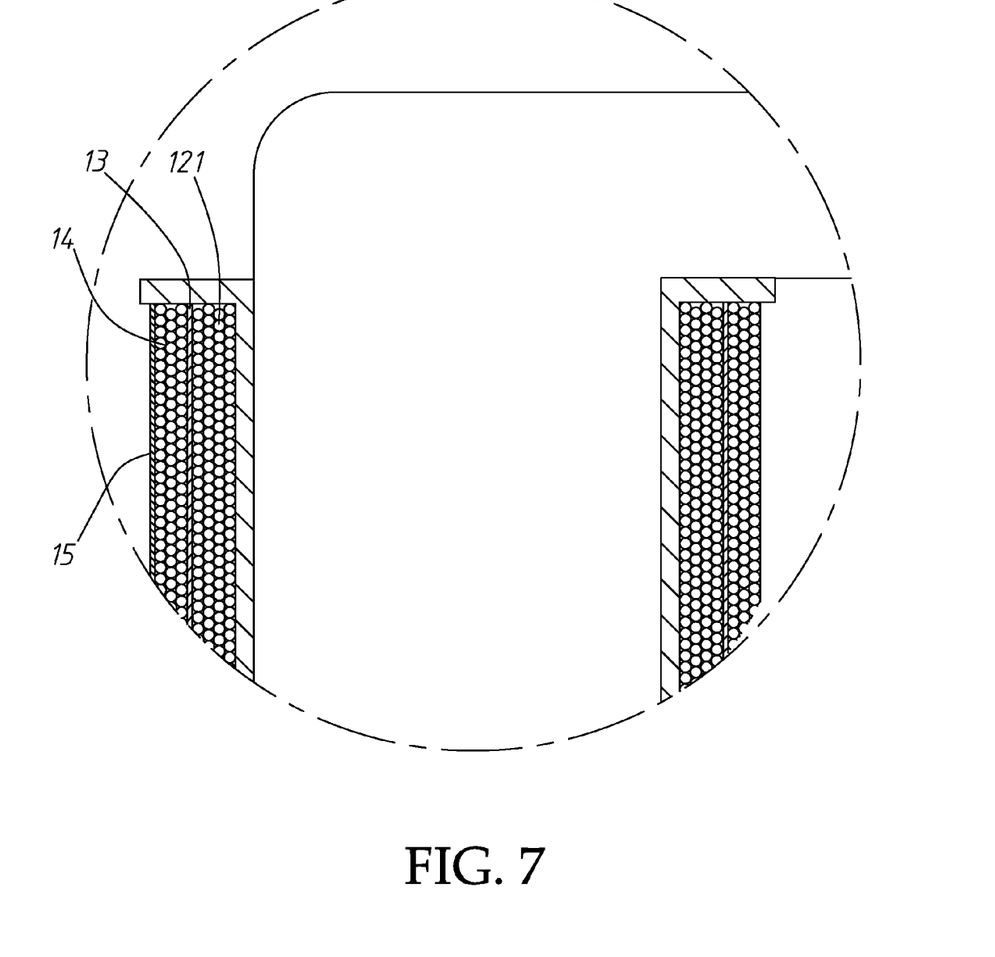
FIG. 7 is an enlarged view of the B portion of FIG. 5.

The secondary coil unit 14 winds the first insulating layer 13 to induce the primary coil unit 121 to generate a low voltage. And the second insulating layer 15 enveloping the secondary coil unit 14, such structure is shown in FIGS. 5 to 7.

The LED lamp set 16 is lightened by the low voltage (for instance 4.5V) induced by the secondary coil unit 14. As shown in FIGS. 1 and 2, the LED lamp set 16 is provided around the water outlet 113 to generate an effect of illuminating a fountain formed from liquid water.

Figure 8:
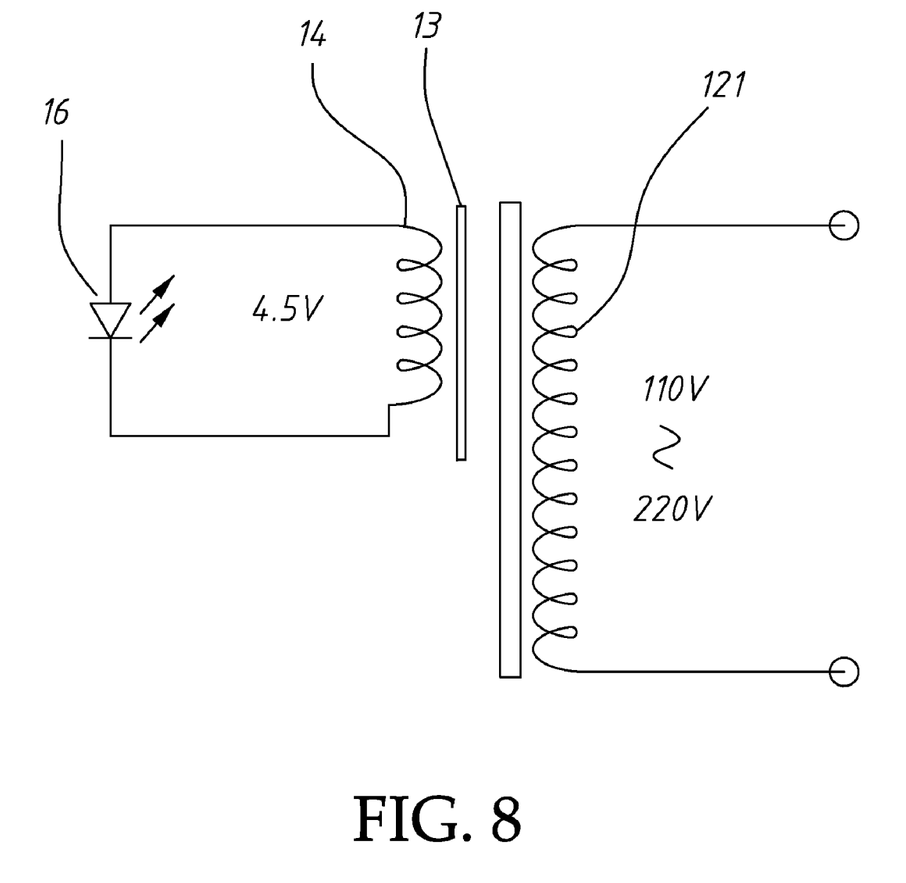
FIG. 8 shows an electric circuit diagram of the present invention.

FIG. 8 shows a simple electric circuit diagram of the present invention, wherein the primary coil unit 121 of the motor unit 12 is connected with a high voltage input power source, while the secondary coil unit 14 envelops the primary coil unit 121 through the first insulating layer 13 to induce and generate a low voltage for using by the LED lamp set 16.

The present invention takes advantage of the kinetic energy during rotation of the internal magnet of the motor unit 12 in the pump 1 for being used as inducing potential, thereby the energy required for illumination of the LED lamps can be obtained, and an effect of energy saving and carbon reducing can be gotten, and thereby the products can be competitive; the present invention only needs a few copper wires and insulating tapes to thereby save the cost of the voltage converter.

Figure 9:
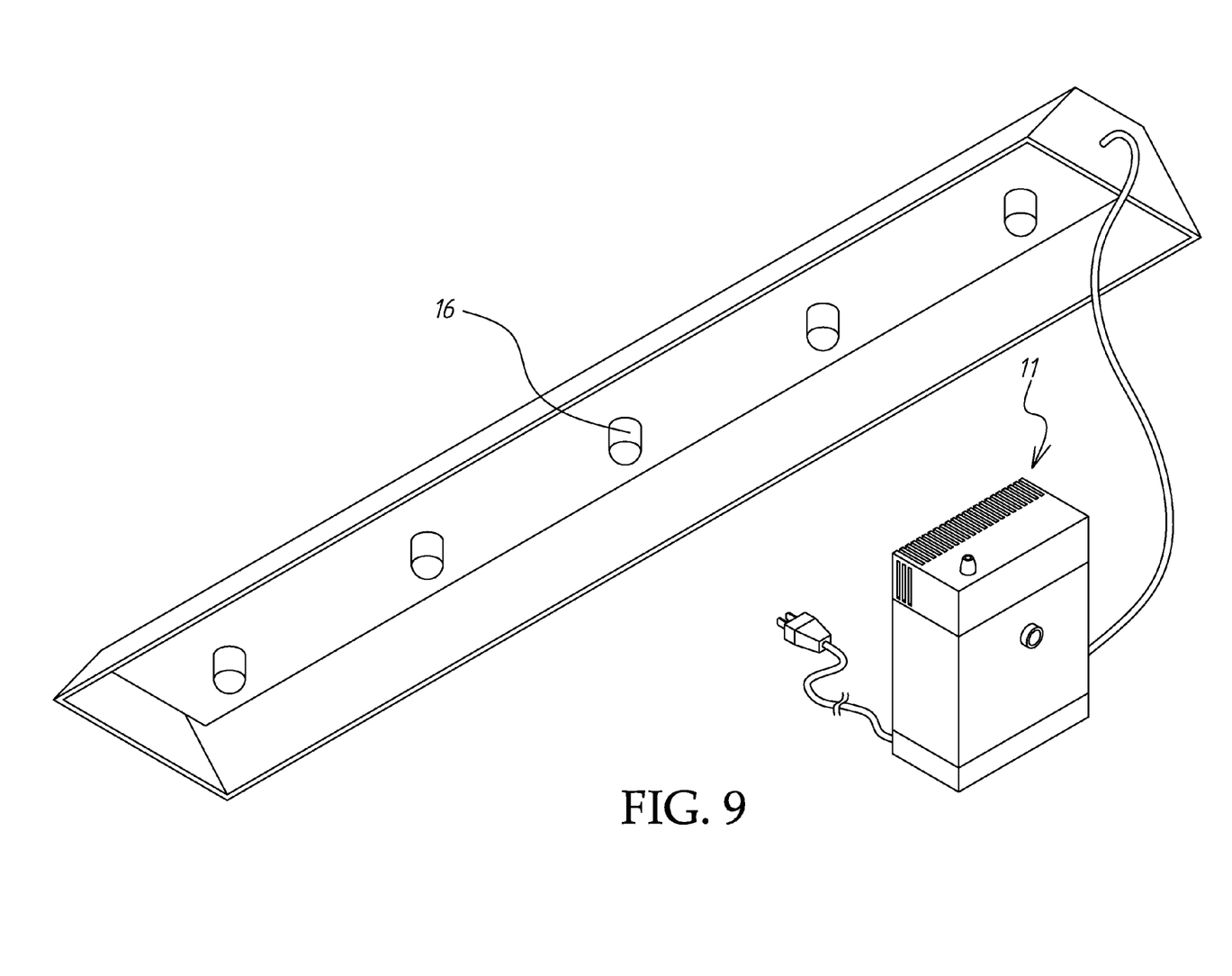
FIG. 9 a perspective view showing the appearance of another embodiment of the present invention.
Figure 10:
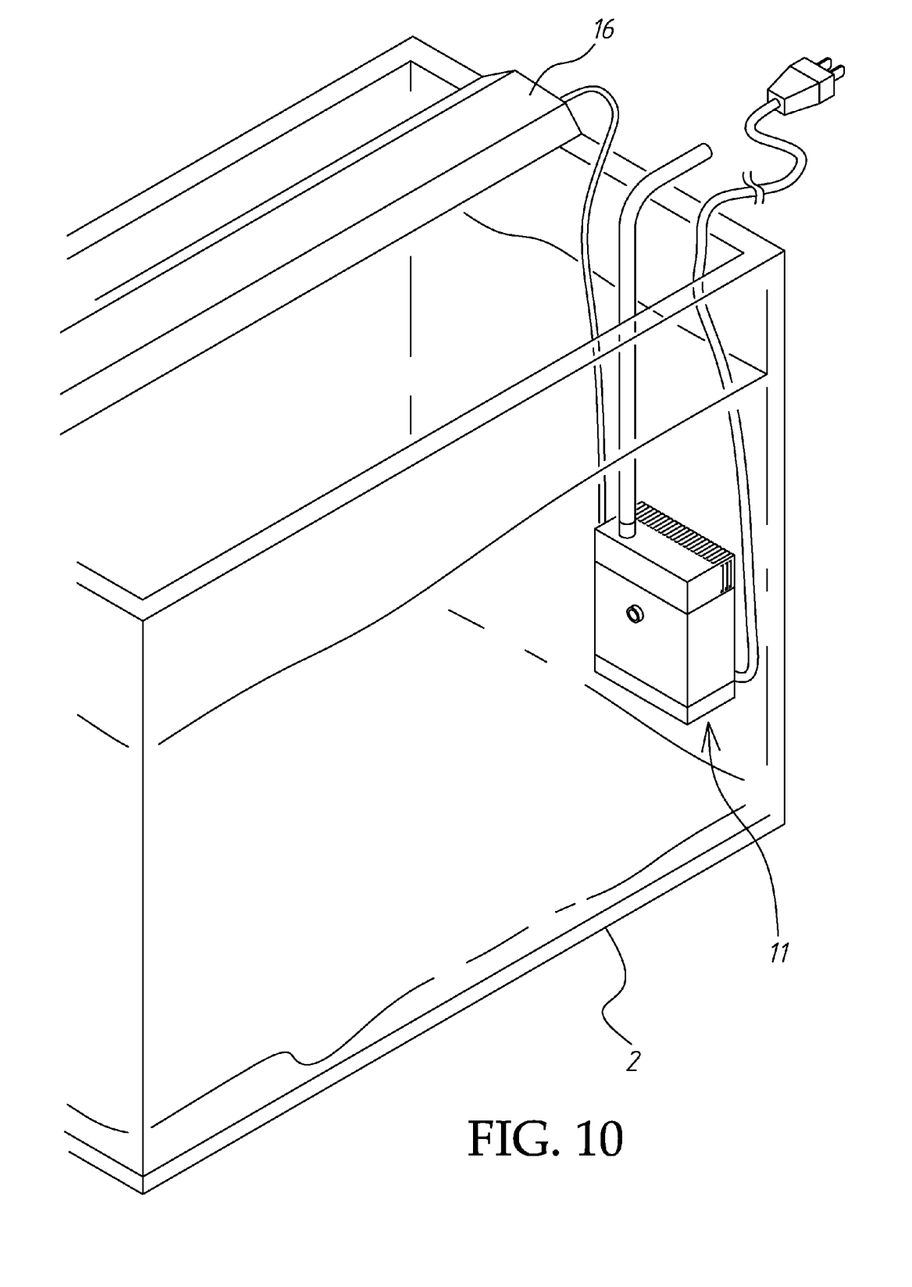
FIG. 10 is a schematic perspective view showing the embodiment of FIG. 9 of the present invention is used in an aquarium.

And more, please refer to FIGS. 9 and 10 showing another embodiment of the aquarium pump with LED lamps of the present invention, wherein the secondary coil unit 14 in the pump housing 11 induces and generates a low voltage for using by the LED lamp set 16 which is provided on the top of the aquarium 2 to form an illuminating lamp such as is shown in FIG. 10.

Obviously, the primary coil unit 121 of the motor unit 12 provided in the pump 1 uses the secondary coil unit 14 to induce and generates a low voltage for using by the LED lamp set 16, hence when the aquarium 2 is mounted with LED lamps, no other electric power converter is needed, this can reduce equipment disbursement, and can get an effect of saving electricity and being environmental conservative by using the LED lamps. Surely, the LED lamp set used in the present invention is not limited to what are shown in the drawings, simple or equivalent changes according to the technical thought of the present invention are included in the protection scope of the present invention.

Figure 11:
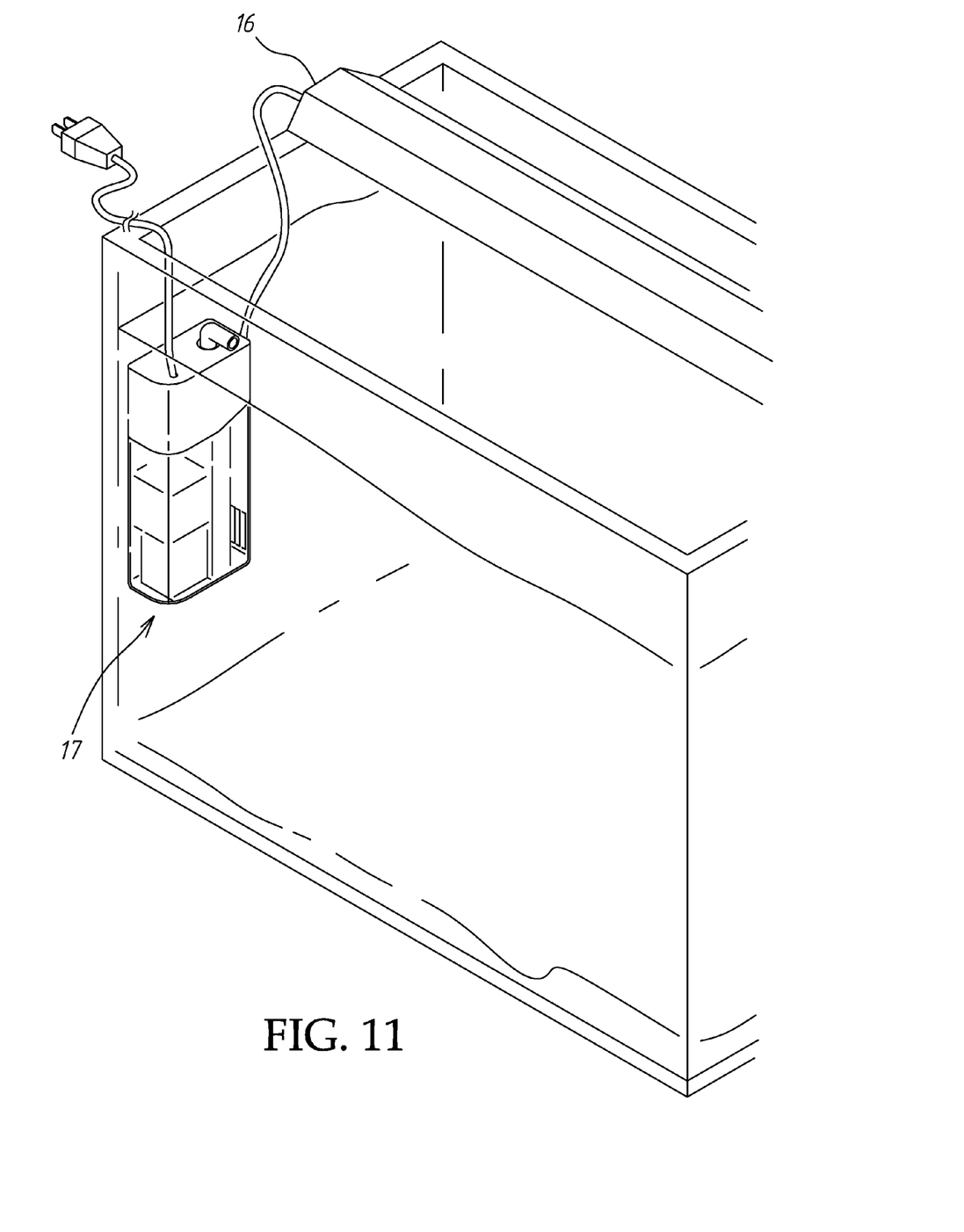
FIG. 11 is a schematic perspective view showing a filter is mounted beneath the pump of the present invention.

In FIG. 11, the aquarium pump having LED lamps of the present invention can be provided beneath the pump housing 11 with a filter 17 to get the function of water filtering. Therefore, a consumer can choose freely to have the function of solely filtering the entering water or have the effect of adding oxygen.

In conclusion, the aquarium pump having LED lamps of the present invention is a novel structure that meets the element requirement for a patent; it will be apparent to those skilled in this art that various modifications or changes without departing from the spirit of this invention shall also fall within the scope of the appended claims.

The invention claimed is:

1. An aquarium pump having LED lamps comprising:
   a pump housing having an air intake for connecting an air pipe, a water inlet unit for entering of water, and a water outlet for pumping liquid and air into an aquarium;
   a motor unit provided in said pump housing and having a set of primary coil units, a first insulating layer, a secondary coil unit and a second insulating layer, said set of primary coil units are connected with a high voltage input power source, the motor unit is electromagnetically configured to rotate a rotor unit, and thereby to mix air and liquid to be pumped out of said water outlet, said set of primary coil units including a first primary coil unit and a second primary coil unit;
   the first insulating layer covering said first primary unit of said set of primary coil units of said motor unit;
   the secondary coil unit located on an exterior of said first insulating layer inducing said first primary coil unit of said set of primary coil units to generate a low voltage, the first insulating layer is located between said secondary coil unit and said first primary coil unit of said set of primary coil units;
   the second insulating layer directly covering said secondary coil unit and said second primary coil unit of said set of primary coil units, said secondary coil unit is located between said first insulating layer and said second insulating layer; and
   a set of LED lamps being lit by said low voltage induced by said secondary coil unit.

2. The aquarium pump having LED lamps as claimed in claim 1, wherein a water proofing glue is poured outside said motor unit and said secondary coil unit in said pump housing.

3. The aquarium pump having LED lamps as claimed in claim 1, wherein said LED lamp set is provided around said water outlet to generate an effect of illuminating a fountain formed from liquid water.

4. The aquarium pump having LED lamps as claimed in claim 1, wherein said LED lamp set is provided on a top of said aquarium to form an illuminating lamp.

5. The aquarium pump having LED lamps as claimed in claim 1, wherein a filter is provided beneath said pump housing.

* * * * *